United States Patent [19]

Kang et al.

[11] 3,818,106

[45] June 18, 1974

[54] TENDERIZATION OF MEAT WITH PROTEOLYTIC ENZYMES

[75] Inventors: Chunghee Kim Kang, Hinsdale; William D. Warner, Elmhurst; Eldon E. Rice, Palos Park, all of Ill.

[73] Assignee: Swift & Company, Chicago, Ill.

[22] Filed: Oct. 2, 1972

[21] Appl. No.: 294,205

[52] U.S. Cl. .................................................. 426/2
[51] Int. Cl. ............................................ A22c 18/00
[58] Field of Search .............. 99/107; 195/68; 426/2

[56] References Cited
UNITED STATES PATENTS

| 3,052,551 | 9/1962 | Hogan | 99/107 |
| 3,539,451 | 11/1970 | Heinicke | 195/68 |
| 3,709,790 | 1/1973 | Beuk et al. | 99/107 X |

*Primary Examiner*—Hyman Lord
*Attorney, Agent, or Firm*—Edward T. McCabe

[57] ABSTRACT

Sulfhydryl proteases such as papain, bromelain or ficin are treated with certain disulfide inactivators to reversibly inacitivate the active enzyme fraction while preserving essentially 100% of the total enzymatic activity. The inactivated enzyme is then injected antemortem into an animal's vascular system wherein the enzyme is reactivated at a controlled rate by naturally occurring reducing agents present in the animal's blood.

20 Claims, No Drawings

TENDERIZATION OF MEAT WITH PROTEOLYTIC ENZYMES

The present invention relates to the preparation of proteolytic enzyme formulations for tenderization of meat by ante-mortem injection. More specifically, the invention pertains to a process for preparing proteolytic enzyme formulations containing large amounts of reversibly inactivated enzyme molecules which are stable during storage, are slowly reactivated in the animal, and which produce minimal adverse animal reaction.

The technique of ante-mortem enzyme injection as a means of meat tenderization is disclosed and claimed in U.S. Pat. No. 2,903,362, issued Sept. 8, 1958. Briefly, this technique involves the injection of a solution of a proteolytic enzyme into the vascular system of a living animal, then holding the animal for a time sufficient to obtain uniform distribution of the enzyme throughout the animal's system, and thereafter slaughtering the animal. Meat cuts derived from animals injected in this manner are very tender and exhibit good textural properties. While this technique is of substantial value in obtaining meat which, when cooked, is uniformly tender, there are some undesirable animal side reactions which occur if commercially prepared enzyme formulations are employed. Specifically, injection of the enzyme into a live animal often causes internal hemorrhaging and edema of the interal organs. As a result, the animal carcass would be condemned.

It has generally been thought that the adverse physiological reactions in live animals were primarily due to the presence of certain undesirable components (impurities) present in the commercially available enzyme. Much work has been done to remove or render harmless these undesirable components from commercial enzyme preparations. For example, U.S. Pat. No. 3,052,551 describes several methods for the purification and/or stabilization of enzyme solutions.

Unfortunately, these purification and/or stabilization procedures result in the irreversible inactivation of a substantial portion of the active enzyme. Since only active enzymes can tenderize meat, the irreversible inactivation of a substantial portion of the active enzyme results in an inefficient product. Work was therefore conducted on methods of reversibly inactivating the proteolytic enzymes without reducing total enzymatic activity. For example, U.S. Pat. No. 3,446,706 describes a method for preparing improved enzyme solutions comprising adjusting the pH of a solution to greater than 7.5, reversibly inactivating the solution by a hydrogen peroxide-catalase treatment, and then holding the solution at a pH of above 7.5 for from 2-24 hours. Although this technique produces a proteolytic enzyme formulation having improved activity, treatment of the enzyme with hydrogen peroxide still causes irreversible inactivation of a portion of the originally active enzymes.

R. N. Heinicke, in U.S. Pat. No. 3,539,451, described a method for reversibly inactivating the enzyme fraction of fresh papaya or fig latex, comprising treating the fresh latex with sodium tetrathionate at a pH in the range of 6.5-8.0. The reversible inactivation with tetrathionate is said to result in an activatable enzyme in high yield. Heinicke indicates in his patent, and particularly in his parent application, Ser. No. 693,612, filed Dec. 26, 1967 (now abandoned), that tetrathionate is the only disulfide reagent which will reversibly inactivate proteolytic enzymes without reducing total enzymatic activity, and which will result in an enzyme formulation that does not cause adverse physiological reactions when injected into live animals.

It is therefore an object of the present invention to provide additional reagents for the reversible inactivation of proteolytic enzymes for ante-mortem injection of animals.

It is another object of the present invention to provide an improved method of preparing reversibly inactivated enzyme formulations for ante-mortem injection of animals.

It is a further object of the present invention to provide an improved method for preparing reversibly inactivated enzyme solutions which are characterized by the retention of essentially 100% of their enzymatic activity.

It is also an object of the present invention to provide an improved method of preparing reversibly inactivated proteolytic enzyme formulations which will not cause adverse physiological reactions upon ante-mortem injection into animals.

Additional objects of the present invention, if not specifically set forth herein, will be readily apparent to those skilled in the art from a reading of the following detailed description of the invention.

We have discovered that, contrary to the work of Heinicke, there are several disulfide reagents, other than sodium tetrathionate, which can be reacted with a sulfhydryl protease to yield a reversibly inactivated enzyme which retains essentially 100% of its original enzymatic activity. Moreover, the disulfide-modified enzymes prepared by our unique method possess sufficiently slow reactivation rates such that adverse physiological reactions in the injected animals is avoided.

Generally, the method of this invention comprises treating a sulfhydryl protease, held at a low temperature and at a pH of 6-12, with one or more of certain disulfide reagents that reversibly inactivate the active enzyme fraction. The reversibly inactivated enzyme may then be injected ante-mortem into animal stock. The invention is directed to the sulfhydryl proteases, i.e. proteases requiring a free sulfhydryl group for its catalytic activity, and is particularly directed to the plant sulfhydryl proteases papain, bromelain and ficin. Commercial enzyme powders of these plant derived enzymes contain a mixture of sulfhydryl proteases. For example, commercial papain contains pure papain enzyme, along with two or more chymopapain enzymes. In addition to the plant sulfhydryl proteases, this invention also contemplates the use of microbial sulfhydryl proteases such as streptococcal proteinase and clostripain, as well as animal sulfhydryl proteases such as cathepsin C.

Commercial food grade enzyme powders contain mixtures of "active" enzyme molecules, "reversibly inactive" enzyme molecules, and "irreversibly inactive" enzyme molecules. The ratios of these three types of molecules vary from one batch of enzyme to another.

"Active" enzyme molecules produce the meat tenderization through proteolysis, but also may cause severe physiological reactions when injected into live animals. For example, intravascular injection of live animals with crude enzyme solutions of either papain, bromelain, ficin, or combinations thereof, containing a substantial portion of active enzyme molecules, produce such symptoms as labored breathing, nasal congestion, depression, frothing at the mouth, and in severe cases the animal will become cyanotic and die. The autopsy findings of such "reactors" usually include hemorrhaging in the kidneys, heart, liver, intestines, gall bladder, and larynx. As a result of these symptoms, the "reactors" are condemned by governmental inspectors. Fully active enzymes may cause very rapid expiration of the animal.

"Irreversibly inactive" enzyme molecules are those which, due to oxidation, hydrolysis, etc., of the active enzyme molecule, have permanently lost their activity, at least under the processing conditions of ante-mortem enzyme solutions, and therefore produce no tenderization effect or animal reaction.

"Reversibly inactive" enzyme molecules appear to produce no tenderization or adverse animal reactions upon intravascular injection. However, these enzymes may be reactivated within the animal's vascular system, thereby producing subsequent tenderization of the meat. Therefore, it is most desirable in methods of ante-mortem meat tenderization by intravascular injection to inject an enzyme solution containing as high a concentration of "reversibly inactive" enzyme molecules as is possible. That is to say, the problem of eliminating animal reaction is to reversibly inactivate the active enzyme molecules in such a manner that the enzyme will be reversibly inactivated at the time of injection, and will not be reactivated between injection and slaughter, or at least will be reactivated at a slow rate that can be tolerated by the animal.

An accepted method for developing a quantitative determination as to the enzyme activity of active molecules and as to the total enzyme activity, which is made up of both the active enzyme molecules and the reversibly inactive enzyme molecules, is set forth in a patent to McAnally et al., U.S. Pat. No. 3,446,626. Essentially, the amount of active enzyme molecules in a given solution is determined by employing a milk clot assay of the available enzyme activity. The units for measuring active enzyme molecules are generally called non-reduced milk clot units (N-RMCU), and are sometimes referred to as the available milk clot activity (AMCU). Where a measure of the reversibly inactive enzyme molecules is desired, a second portion of the enzyme solution is treated with an activator or reducing agent such as cysteine, cyanide, bisulfite or the like, whereby all the reversibly inactivated enzyme is restored to the active state. The milk clot assay using added cysteine or other activators measures both the active and the reversibly inactive enzyme molecules. This measurement is referred to as either Reduced Milk Clot Units (RMCU) or Total Milk Clot Activity Units (TMCU). Any reduction in this value during processing indicates a loss in the overall enzyme activity of the solution being assayed. However, reduction in the N-RMCU without a corresponding reduction in the RMCU value, indicates the amount of active enzyme molecules which have been converted to reversibly inactivated molecules.

As has been previously mentioned, it was formerly believed by those skilled in the art that adverse animal reactions upon injection of proteolytic enzymes was due in part to impurities caused by enzyme autolysis and to the presence of impurities in the enzyme formulation, and specifically non-enzyme proteins and low molecular weight compounds. We have discovered however that with proteolytic enzymes, the animal reaction is apparently caused solely by the active enzyme per se. That is, when the enzyme is purified and then activated, it causes severe reaction when injected into animals. Even though most of the non-enzyme protein and low molecular weight compounds have been removed, the purified active enzyme causes as severe a reaction as an equivalent amount of crude enzyme. Thus no amount of purification of an active enzyme will eliminate animal reaction. In view of these discoveries, it became apparent that to obtain truly efficient enzyme formulations for ante-mortem injection, an inactivating reagent must meet all of the following requirements: (1) it must reversibly inactivate proteolytic enzyme, such that the enzyme will be inactive at the time of ante-mortem injection; (2) it must provide a modified enzyme that will reactivate in situ at such a rate that active enzyme will not be released between injection and slaughter so as to cause adverse physiological reactions, but active enzymes for tenderization will be released between slaughter and consumption of the meat; (3) it must not be toxic to humans at the levels that it will be present in the tenderized meat.

We have discovered that several low molecular weight, symmetrical disulfide compounds meet the above three criteria, and therefore have utility in the ante-mortem injection of animals with proteolytic enzymes. In addition to sodium tetrathionate, suitable disulfide compounds in this class include 2-hydroxyethyl disulfide, bis ($\beta,\gamma$-dihydroxy propyl) disulfide, dithiodipropanol, 6, 6-dithiodinicotinic acid, tetramethylthiuram disulfide, cystine, thiamine disulfide, garlic juice disulfide, oxidized glutathione, and mixtures thereof. In addition to these disulfide compounds, certain sulfhydryl compounds, which are normally considered enzyme activators, may be used to reversibly inactivate sulfhydryl proteases. These sulfhydryl compounds include mercaptoethanol, cysteine, thioglycerol, dimethyldithio carbamic acid, mercaptopropanol, thionicotinic acid, reduced glutathione and mixture thereof. When these latter compounds are added to an enzyme solution, they undergo air oxidation over a period of several hours to form their disulfide dimer. The level of activity is selected so that the oxidation will be completed in a reasonable period of time. Accordingly, mercaptoethanol is oxidized to 2-hydroxyethyl disulfide, thioglycerol is oxidized to bis ($\beta,\gamma$-dihydroxy propyl) disulfide, cysteine is oxidized to cystine, etc. The disulfide oxidation product of these compounds is the compound which actually reversibly inactivates the proteolytic enzymes. Of course, the sulfhydryl compound could be oxidized to its disulfide form prior to addition to the enzyme solution.

The above-noted compounds will reversibly inactivate sulfhydryl proteases; however, certain of the disulfide compounds may be more effective when used with one enzyme than another. That is, for a given disulfide inactivator, the rate of inactivation and/or reactivation may vary from one proteolytic enzyme to the next. Thus it has been found that the reactivation rate of papain is generally slower than that of bromelain. For example, 2-hydroxyethyl disulfide will inactivate both bromelain and papain; but using 1 mM glutathione as an activator (see Example 4), the 10 minute reactivation rate is 9.2% for bromelain and less than 1% for pure papain.

Contrary to the utility of the above-listed disulfides, most disulfide compounds are not completely suitable for the preparation of reversibly inactive proteolytic enzyme formulations for ante-mortem injection. This is because most disulfide compounds either will not reversibly inactivate the enzymes, or they may be too toxic, or they result in an inactivated enzyme which reactivates too rapidly in the animal bloodstream. Thus disulfide compounds such as cystamine, methyl disulfide, paramino-phenyl disulfide, 4, 4-dithiodipyridine, 5, 5-dithio-bis-(2-nitrobenzoic acid) disulfide, dithiodiglycolic acid, dithiodipropionic acid, dithiodibutyric acid, di-n-propyl disulfide, benzyl disulfide, 2-benzothioazoyl disulfide and formamidine disulfide fail to meet all of the requirements of the present invention. Generally, it has been determined that the ineffective disulfide compounds have more electronegative substituents attached to the sulfur atoms than do the effective disulfide compounds.

The reaction of sulfhydryl proteases with the symmetrical disulfide compounds of this invention proceeds in accordance with the following equation:

$$ESH + RSSR \underset{\text{Activation}}{\overset{\text{Inactivation}}{\rightleftharpoons}} ESSR + RSH$$

where ESH is the active sulfhydryl enzyme, such as papain, bromelain, or ficin; RSSR is the symmetrical disulfide inactivator; ESSR is the reversibly inactivated enzyme (a mixed disulfide of the sulfhydryl enzyme); and RSH is a low molecular weight thiol compound formed during the reaction.

The reaction proceeds best at neutral or alkaline pH. Apparently, the proteolytic enzyme (ESH) must be ionized (ES-) before the reaction proceeds. The reaction can be driven to completion by oxidation of the thiol (RSH) to the disulfide form by air or with other oxidizing agents. This type of reaction generally proceeds at low temperatures (ice bath temperature) and occurs with virtually no side reactions. Thus, the yields of reversibly inactive enzyme (ESSR) approach 100%.

In the literature, this reaction is generally classified as a thiol-disulfide exchange reaction. This reaction has been known to those in the art for many years, and more recently has been applied to inactivate sulfhydryl enzymes. For example, see "Studies on the Active SH Group of Papain" by Sanner and Pihl, Journal of Biological Chemistry, Vol. 238, January 1963, and "The Scission of the Sulfur-Sulfur Bond" by Parker and Kharasch, Chem. Review, Vol. 59, Page 583, 1959. While the reaction itself is well-known, its application to the ante-mortem tenderization of meat is new and unexpected in view of the discovery that only a limited group of disulfide compounds will reversibly inactivate proteolytic enzymes to yield modified enzymes characterized by suitable reactivation rates.

All of the effective disulfide compounds previously mentioned are symmetrical disulfides, i.e. the chemical groups "R" of the RSSR disulfide are the same. However, by utilizing the thiol-disulfide exchange reaction, a symmetrical disulfide can be converted to a mixed or asymmetrical disulfide:

$$R_1SH+R_2SSR_2 \rightarrow R_1SSR_2+R_2SH$$

where $R_1$ and $R_2$ are different. Thus for a given list of thiols and symmetrical disulfide compounds, many combinations of mixed disulfides can be prepared. Depending on the chemical grouping represented by R, the asymmetrical disulfide can be as effective as the symmetrical disulfide in reversibly inactivating sulfhydryl proteases.

The equation for reversible inactivation by an asymmetrical disulfide is as follows:

$$ESH+R_1SSR_2 \rightarrow ESSR_1+R_2SH$$

where $R_1$ and $R_2$ are different. Theoretically, both $R_1$ and $R_2$ could form a mixed disulfide with the enzyme ESH. However, in actual practice, one form is usually more stable than the other, and thus predominates.

Special mention should be made of thiamine disulfide, which is non-toxic and has nutritional significance as a vitamin. Thiamine disulfide does not react directly with proteolytic enzymes so as to cause a reversible inactivation. Apparently, thiamine disulfide does not form a mixed disulfide with large molecules, such as papain enzyme, and is thus unable to inactivate the enzyme molecule. However, thiamine disulfide will react with low molecular weight thiol compounds to form mixed disulfides. For example, thiamine disulfide will react with glutathione, cysteine, and other naturally occurring thiol compounds to form a mixed disulfide which will inactivate the enzyme protease. In this manner thiamine disulfide can be used to reversibly inactivate sulfhydryl proteases.

It should be clear then that the thiamine disulfide could be first reacted with a low molecular weight thiol, and then the resulting mixed disulfide utilized as the inactivating disulfide RSSR in the above formula. On the other hand, thiamine disulfide can be added directly to crude or commercial grade solutions of enzymes containing a high level of naturally occurring thiol inactivators, such as glutathione. For example, aqueous solutions of crude papain contain high levels of glutathione, and air oxidation of the glutathione would require a long period of time. By adding an excess of thiamine disulfide, usually from about 1 to 100 moles per mole of enzyme in solution, a mixed disulfide is formed between glutathione and thiamine disulfide, which in turn reversibly inactivates the enzyme.

When thiamine disulfide is used in the above manner, i.e. added directly to a crude or commercial grade enzyme solution, it is often desirable to use it in conjunction with another disulfide inactivator. In this way, the thiamine disulfide will tie up the naturally occurring reducing compounds e.g. glutathione, while the second disulfide reversibly inactivates the protease. In addition to thiamine disulfide, garlic juice disulfides also reversibly inactivate proteases in an indirect manner by first reacting with low molecular weight thiols.

The reactions for indirect inactivation, as with thiamine disulfide, proceed as follows:

$$R_1SH+R_2SSR_2 \rightarrow R_1SSR_2+R_2SH$$

$$ESH+R_1SSR_2 \rightarrow ESSR_1+R_2SH$$

where $R_2SSR_2$ is thiamine disulfide, $R_1SH$ is a low molecular weight thiol compound, ESH is the sulfhydryl protease, and $R_1SSR_2$ is a mixed disulfide.

The initial step of the present invention involves preparation of a proteolytic enzyme suspension or solution. Crude enzymes, food grade enzymes and/or relatively pure enzymes may be employed. Food grade enzymes are usually used inasmuch as crude enzymes contain high concentrations of undesirable contaminants, and pure enzymes are relatively expensive to prepare. The reaction may be initiated by adding the disulfide inactivator to a paste suspension of the enzyme prepared by mixing about equal parts of glycerine and enzyme, and then forming a solution by adding cold water to the suspension. Alternatively, the reaction may be initiated by adding the disulfide inactivator to a water solution of the enzyme, or by adding a disulfide inactivator/enzyme powder mixture to water to form a solution. The final enzyme solution may have an enzyme concentration of from about 0.25% to 25% by weight, but enzyme solutions containing about 2–10% of the enzyme by weight are generally preferred.

Because of the presence of heavy metal ions in most commercial enzyme preparations, it is generally desirable to add chelating agents to the enzyme solution in order to tie up the heavy metal ions, thus lowering their effective concentration. This step is particularly important with crude enzyme powders which contain substantial amounts of interfering metal ions. The presence of a suitable chelating agent, such as salts of ethylenediamine tetraacetic acid (EDTA), helps to assure rapid inactivation of the enzyme. In addition to the salts of EDTA, other suitable chelating agents include citrate salts such as sodium citrate, and phosphate salts such as tetrasodium pyrophosphate, sodium tripolyphosphate, and sodium hexametaphosphate. Also, nitrilotriacetic acid, diethylenetriamine pentaacetic acid, and n-hydroxyethyl amino diacetic acid may be employed. The amount of chelating agent required will of course depend upon the concentration of heavy metal ions present in the enzyme formulation. Generally, a chelating agent molarity of from about 0.025 to about 0.3 is suitable.

The enzyme suspension or solution should have a proper temperature and pH in order to obtain an efficient inactivation. The reaction could be carried out at temperatures of from 0°C. to 60°C. However, the use of temperatures in the range of 60° may result in irreversible inactivation of the active enzyme fraction. Therefore, it is generally preferred to carry out the reaction within a temperature range of from about 0°C. to about 25°C., with the most preferred temperature range being from 0°C. to 5°C. Use of low temperatures inhibits bacterial growth in the enzyme solution, thereby preserving enzyme activity. The pH of the enzyme suspension or solution should be adjusted to from about 6 to 12, and preferably from about 7 to 9, in order that the sulfhydryl enzyme will be ionized to the ES- form. In this ionic state, the enzyme will readily react with the disulfide reagent to form a reversibly inactivated mixed disulfide of the sulfhydryl enzyme. It is important that pH of the enzyme solution be adjusted into the desired range soon after preparation of the solution in order that undesirable side reactions are avoided. A pH in the range of 10–12 is generally only used with solutions of papain.

The concentration of inactivating disulfide compounds to be added depends upon several factors, including the concentration of the enzyme in solution, the inactivator to be used, and the concentration of non-enzyme activator compounds that are present in the enzyme preparation. With so many variables, it is generally necessary to determine experimentally the ratios of inactivator to enzyme required to effect complete reversible inactivation of the active enzyme fraction. Theoretically, one mole of inactivator will react with one mole of enzyme to form one mole of mixed disulfide. However, commercial food grade powders contain non-enzyme sulfhydryl components and metal ions that use up part of the inactivator or interfere with its effectiveness. Hence, molar ratios of inactivator to enzyme of from about 1 to about 100, and preferably from about 1 to about 10, have been found more adequate for rapid and essentially complete inactivation of commercial enzyme powders. Moreover, an excess of the disulfide inactivator present in the proteolytic enzyme solution will act to tie up glutathione present in the animal's blood stream, thus retarding rapid reactivation of the mixed disulfide enzyme.

Once the active enzyme fraction has been reversibly inactivated, the enzyme solution can be injected antemortem into an animal's vascular system. It should be understood that it is the amount of potential enzyme activity injected that is important to controlled tenderization. Generally, it has been found that, depending on the type of animal and the potency of the enzyme preparation, it is necessary to inject from 0.1 to 150 mg. of the enzyme per lb. of live weight of the animal, with 0.5 to 60 mg. per lb. of live weight being a preferred range. The animal should be slaughtered within about 1 hour from injection. If the animal is slaughtered too quickly after injection, the enzyme will not have had a chance to be uniformly circulated throughout the animal's vascular system. On the other hand, if the animal is not slaughtered fairly soon after injection, the tenderization effect of the enzyme will not be achieved. Usually it is preferred to dispatch the animal about 10–30 minutes after injection.

The present invention depends on two primary factors for success. First, the enzyme must be in a reversibly inactive state at the time of injection. Secondly, the rate of reactivation by reducing agents (mainly glutathione) in the blood must be suitably slow. Of course, the reactivation rate is in part dependent on the level of glutathione in the blood; the higher the level, the faster the reactivation. Glutathione level is known to vary from one animal to another, and from one species to the next. Thus, the rate of reactivation would vary accordingly. We have discovered several techniques for nullifying this blood glutathione factor. As previously mentioned, adding an excess of disulfide inactivator to the enzyme will act to tie up blood gluathione. In addition, we have discovered that by injecting oxidizing or disulfide reagents prior to injection of the enzyme, we could lower the activating capacity of the blood, and thus lower animal reaction. Potassium iodate or tetrathionate function are satisfactory reagents for lowering the activating capacity of the blood, but other reagents work equally well.

The uniqueness and many advantages of the present invention are readily apparent from the following considerations. Firstly, the reaction time required to reversibly inactivate the proteolytic enzyme is greatly reduced. Prior art methods which reversibly inactivate the enzyme by holding the solution at an alkaline pH require from about 12 to 24 hours to achieve inactivation of the enzyme; and many preparations can never be fully inactivated by such treatment. Also, prior art inactivation techniques employing hydrogen peroxide, while relatively fast, result in irreversible inactivation of the originally active enzyme fraction.

Secondly, the present invention results in yields of reversibly inactive enzymes approaching 100%. It is practically impossible to obtain these high yields of reversibly inactivate enzyme when the prior art hydrogen peroxide technique is employed, as addition of hydrogen peroxide causes an irreversible loss of activity.

Thirdly, the present method results in a more stable enzyme solution. The mixed disulfides (ESSR) produced by the present method are resistant to further oxidation and self-digestion (autolysis). Thus, normal enzyme activity losses during enzyme processing (filtering, freezing and storage) are minimized. Storage tests indicate that the enzyme activity of the present disulfide inactivated enzymes is higher than that of companion solutions identical except for absence of disulfide inactivator.

Fourth, and probably most important, the modified enzymes obtained by the present invention are slowly reactivated in the live animal. Animals will tolerate a certain level of active enzyme. If the reactivation rate of the enzyme in the blood is such that this level of active enzyme is not exceeded, an adverse physiological reaction will not materialize. By testing various disulfide inactivated enzymes with various levels of blood glutathione, one practicing the present invention can accurately predict which disulfide inactivator will result in the proper reactivation rate for his particular needs. This control of reactivation rate of the reversibly inactivated enzyme is unique to the present invention. Reversible inactivation by prior art techniques, such as holding at high pH and/or hydrogen peroxide treatment, do not afford any control over the reactivation rate of the enzyme once injected into the animal bloodstream.

EXAMPLE I

By definition, a milk clot unit (MCU) is that amount of activity in 1 ml that will cause 5 ml of milk substrate to clot in 60 seconds at 40°C. Thus the formula for calculating the milk clot unit of a properly diluted enzyme solution is as follows where $t$=clotting time in seconds:
MCU/ml=60/$t$ Separate assay procedures have been used for the determination of reduced (RMCU) and non-reduced (NRMCU) milk clot units. RMCU values are determined using enzyme and milk substrates, both of which are treated with cysteine-versene solution prior to clotting; NRMCU values are determined in the same manner except that the cysteine-versene treatment is omitted. NRMCU values are a measure of active enzyme only, whereas RMCU values measure both active and reversibly inactive enzyme activity. Examples of three typical assays are given in the following Table:

| | pH | RMCU | NRMCU |
|---|---|---|---|
| Freshly prepared bromelain* | 4.2 | 220 | 125 |
| Aged bromelain** | 9.0 | 186 | 17 |
| Tetrathionate inactivated | 9.0 | 220 | 0.5 |

*Only water added and analyses made ten minutes later.
**pH adjusted to 9.0 and solution held at 15°C. for 24 hours.

The data shows that freshly prepared bromelain contains a high level of active enzyme (NRMCU), and that aging at an alkaline pH reversibly inactivates a large portion of the active enzyme. However, the data also shows that aging caused a loss in total activity (RMCU), i.e. part of the active enzyme was irreversibly inactivated. In contrast, the tetrathionate inactivated enzyme solution lost none of its original activity.

EXAMPLE II

In a typical inactivation procedure, 2.5 millimols of inactivator, 8 grams of enzyme powder, and 8 grams of glycerine were mixed to the consistency of a smooth paste. Separately, a 4 gram quantity of tetrasodium ethylenediaminetetraacetic acid (EDTA) was dissolved in approximately 175 ml of ice cold distilled water containing enough 5N NaOH (predetermined) so that after mixing with the enzyme paste the solution will equilibrate to the desired pH. At time zero, the EDTA-NaOH solution was poured into the ice cold enzyme slurry, and stirred. The resulting mixture was diluted to 200 ml, bringing the enzyme powder concentration to 4%. When assayed at intervals, along with solutions of the same enzyme concentration without EDTA, values were obtained as shown in the following Table:

NRMCU VALUES OF 4% BROMELAIN SOLUTIONS AFTER TREATMENT IN
2.5 mM 2-HYDROXYETHYL DISULFIDE SOLUTION FOR VARIOUS TIME INTERVALS

| | Time (Minutes) | | | |
|---|---|---|---|---|
| | 15 | 30 | 60 | 120 |
| pH 5 | | | | |
| With EDTA | 12 | 12 | 12 | 12 |
| Without EDTA | 12 | 12 | 12 | 12 |
| pH 6 | | | | |
| With EDTA | 12 | 12 | 12 | 12 |
| Without EDTA | 12 | 12 | 12 | 12 |
| pH 7 | | | | |
| With EDTA | 12 | 12 | 9 | — |
| Without EDTA | 12 | 12 | 12 | 12 |
| pH 8 | | | | |
| With EDTA | 12 | 10 | 7 | — |
| Without EDTA | 12 | 12 | 10 | 6 |
| pH 9 | | | | |
| With EDTA | 3 | <1 | <1 | <1 |
| Without EDTA | 9 | 6 | 4 | 3 |
| pH 10 | | | | |
| With EDTA | 2 | <1 | <1 | <1 |
| Without EDTA | 5 | 4 | 3 | 2 |

The data illustrates the importance of proper pH and the presence of chelating agents in the efficient inactivation of the active enzyme fraction. Disulfide treatment at an acidic pH or without the presence of a chelating agent results in either no inactivation or very slow inactivation. On the other hand, when the enzyme solution contains a chelating agent, and the pH has been adjusted to from 7 to 10, reversible inactivation by the disulfide reagent takes place quite rapidly.

EXAMPLE III

Because of the great expense involved in carrying out animal reaction tests with cattle, chickens and sheep were used to test physiological responses and tenderness. To evaluate animal reaction in chickens, varying levels of crude enzyme were injected, and progressive symptoms were noted and evaluated on a 0–10 scale as follows:

Rating

0. No physiological reaction detected
1. Increasing degrees of reaction including
2. reddening of comb, lachyrimation, gasping
3. 
4. 
5. Increasing degrees of severe reaction including
6. gasping, lachyrimation, cyanosis and beginning
7. of a comatose condition 8. Comatose, near death
9. Dead in 10–15 minutes
10. Dead in less than 10 minutes When active bromelain, prepared by adding cysteine to a crude bromelain solution, was injected at varying levels, the degree of animal reaction increased as the quantity of active enzyme injected increased. At sufficiently low levels, no detectable symptoms of physiological reactions were noted, as the following Table shows. Above about 20 RMCU/lb the animal reaction is severe.

| RMCU/lb | Rating (Individual Birds) |
|---|---|
| 0 | 0, 0, 0, 0 |
| 5 | 0, 0 |
| 10 | 1, 1 |
| 20 | 3, 3, 4, 5, 5, 4 |
| 25 | 7, 9, 7, 9 |
| 30 | 9, 9, 9, 10, 8 |
| 40 | 10, 10, 9 |

Aging enzyme solutions at alkaline pH generally lowers animal reaction, as indicated in U.S. Pat. No. 3,446,626 to McAnally. However, addition of cysteine to such solutions prior to injection causes reactivation and a fatal physiological response as indicated in the following experiment where chickens were injected with high levels of enzyme; 40 RMCU/lb for bromelain and 13 RMCU/lb for papain.

|  | Animal Reaction |
|---|---|
| Fresh bromelain | 8 |
| Aged bromelain | 6 |
| Fresh bromelain & cysteine | 10 |
| Aged bromelain & cysteine | 10 |
| Low NRMCU papain | 2.5 |
| Aged Low NRMCU papain | 2.5 |
| Low NRMCU papain & cysteine | 10.0 |
| Aged Low NRMCU papain & cysteine | 10.0 |
| Cysteine only | 0 |

This experiment shows that it is the active enzyme fraction which is primarily responsible for adverse animal reactions following ante-mortem injection.

EXAMPLE IV

Enzyme solutions were inactivated as outlined in Example II. The excess inactivator was removed by repeated precipitation of the enzyme with ammonium sulfate (40g/100 ml) or by passing the solution through Sephadex G25. Then the inactive enzyme was dissolved in pH 7 buffer to give a concentration of 0.3 mM, based on an estimated molecular weight of 18,000.

The reactivation rate was determined by measuring amidase activity using benzoylarginine naphthyl amide (BANA) as a substrate and glutathione (GSH) as activator. A 9.9 ml quantity of 2 millimolar BANA solution in .05 molar pH 7 phosphate buffer was placed in test tubes and equilibrated to 40°C. in a water bath. At zero time, 1 ml of 0.3 millimolar enzyme solution was mixed with 1 ml of GSH of the desired concentration, ranging from 1–10 millimolar. Activation of enzyme was carried out at 25°C. and terminated by hundred-fold dilution of enzyme-activator mixture at time intervals of 0, 1, 2, 4, 6, 8, and 10 minutes. An aliquot of 0.1 ml of enzyme-activator mixture was transferred into 9.9 ml of BANA solution, and reacted for 15 minutes at 40°C. The activity of activated enzyme was measured as described by Blackwood & Mandle (BANA Method), Analytical Biochemistry 2, p. 370-379 (1961). The enzyme activity was calculated as BANA units per mole of enzyme. As mentioned earlier, the important consideration here is how much active enzyme is released between injection and slaughter. Therefore, the percents of enzymes that have become active in 10 minute periods at 25°C. when treated with 1 mM glutathione have been tabulated along with the animal reactivity of the samples.

| Inactivator | Percent of Activated Bromelain* | Animal Reaction** |
|---|---|---|
| Control - Aged (U.S. No. 3,446,626) | 27.6 | 7.0 (9) |
| 2-Hydroxyethyl disulfide | 9.2 | 2.5 (4) |
| Bis (β,γ-dihydroxy propyl) disulfide | 11.2 | 3.7 (8) |
| Sodium tetrathionate | 12.1 | 1.8 (12) |
| Tetramethyl thiuram disulfide | 17.7 | 7.4 (5) |
| Cysteine hydrochloride | 26.7 | 6.2 (4) |
| Cystamine | 58.5 | 8.8 (6) |

*Percent of bromelain that has been reactivated in 10 minutes at 25°C. with 1 mM glutathione.
**Injected into chickens at dosage level of 40 RMCU/lb and rated as to degree of animal reaction as described in Example III. The number of chickens per test is shown in parenthesis.

This experiment shows that 2-hydroxyethyl disulfide, Bis (β,γ-dihydroxy propyl) disulfide, tetramethyl thiuram disulfide, and sodium tetrathionate will reversibly inactivate the enzyme to a mixed disulfide form characterized by a relatively slow rate of reactivation in the presence of glutathione. The use of cysteine hydrochloride (which would first be oxidized to cystine) gives a reactivation rate comparable to prior art aging techniques, whereas the use of cystamine as the inactivator results in a modified enzyme having an unsuitably rapid rate of reactivation.

EXAMPLE V

Bromelain solutions inactivated with several different inactivators were injected into chickens at a level of 40 RMCU/lb. At the end of 15 minutes the symptoms were rated, and the time between injection and death was determined for two chickens per sample.

| Disulfide Inactivator | Rating of Animal Reaction Severity at 15 Minutes | Survival Time Minutes |
|---|---|---|
| Sodium Tetrathionate | 2, 2 | 28,43 |
| Mercaptoethanol (oxidized to 2-hydroxyethyl disulfide) | 2, 3 | 31,60 |
| Thioglycerol (oxidized to Bis (β,γ-dihydroxy propyl) disulfide | 2, 2 | 35,63 |
| Reactivated bromelain | 10, 10 | 7,5 |

Survival time varies from animal to animal. However, even at these high dosages, the above inactivators provided protection for at least 15 minutes.

EXAMPLE VI

Groups of six sheep per sample were injected with various enzyme preparations at 40 RMCU/lb. They were dispatched by bleeding twenty minutes after injection. Five organs, namely, heart, gall bladder, mediastinal lymph nodes, kidneys and larnyx were rated on a 0–10 scale as to severity of reaction. Then the organ rating scores for each aminal were totaled and divided by the number of organs to get an average organ score. Another method of evaluating reactions is to calculate the percent of organs in a given group which were rated 5 or above. The average results were as follows:

| Treatment of Bromelain | Average Organ Score | Percent of Organs Rated 5 or Above |
|---|---|---|
| Non-injection (no enzyme) | 1.1 | 3 |
| Inactivated by aging at pH 9.0 | 4.3 | 46 |
| Inactivated with oxidized mercaptoethanol | 2.8 | 24 |
| Inactivated with oxidized thioglycerol | 2.0 | 19 |
| Inactivated with sodium tetrathionate | 1.9 | 10 |

In all cases the severity of the animal reaction was reduced by prior treatment of the enzyme with the noted disulfide inactivators. It should be remembered that the level used was substantially higher than required for tenderization.

EXAMPLE VII

To demonstrate the tenderizing effect of properly inactivated enzymes, sheep were injected at a tenderizing dosage. The mutton roasts were cooked by conventional methods and the meat was evaluated for tenderness by an expert panel using a 0–10 scale (10=excellent tenderness). The average scores for three sheep per bromelain sample are listed in the following table:

| | Avg. Tenderness Score |
|---|---|
| Non-injected (no enzyme) | 7.84 |
| Inactivated by aging at pH 9.0 | 9.03 |
| Inactivated with oxidized mercaptoethanol | 9.47 |
| Inactivated with Tetrathionate | 9.67 |

The data show that full tenderizing activation was obtained from the disulfide inactivated bromelain samples.

EXAMPLE VIII

Separate aliquots of thoroughly mixed ground, lean beef were emulsified in a meat chopper with varying amounts of bromelain which had been inactivated by treatment with various disulfide inactivating agents by the procedure described in Example II. The meat emulsions were then stuffed into cellulose casings, yielding "sausages" about 18 mm in diameter and 130 mm long. These were immediately frozen and held until used. For testing, sausages were sealed under vacuum in moisture resistant, low-oxygen-permeability, propylene-saran coated, cellophane-polyethylene laminated pouches. They were then tempered for 16 hours at about 5°C., and cooked in a constant temperature water bath at 60°C. for 60 minutes. Cooked sausages were cut into five or six 15 mm long cylinders and tested for tenderness with a consistometer. This apparatus consisted of a vertically mounted penetrometer shaft connected to a mechanical pressure gauge and driven vertically at a constant speed by a motor and gear assembly. The shaft terminates in a 7.5 mm flat surface which is forced into the test substance at a constant speed. Resistance to penetration is indicated in arbitrary units on the dial of the gauge.

The resistance of sections of sausages made with varying amounts of enzyme is inversely proportional to the enzyme content, as indicated in the table below. Sausages containing bromelain inactivated with organic disulfides showed even less resistance than anticipated on the basis of the RMCU values, demonstrating their reactivation during the mixing, storage, or cooking operations. Improved stability of the enzyme which had been inactivated prior to use is indicated by the lower resistance values of the samples treated with disulfide as compared to enzyme that had not been inactivated, or which had been inactivated with NaOH according to the method of U.S. Pat. No. 3,052,551. Bromelain inactivated with a non-disulfide agent, e.g. iodo-acetate, is non-reversible, as shown below.

RESISTANCE OF ENZYME-TREATED & NON-ENZYME-TREATED COOKED BEEF SAUSAGES TO PENETRATION

| Enzyme Used | RMCU Added per lb. Meat | Resistance Units |
|---|---|---|
| None | 0 | 65.2 |
| Crude Bromelain | 2.5 | 50.8 |
| do. | 5.0 | 48.7 |
| do. | 7.5 | 33.8 |
| do. | 10.0 | 22.7 |
| do. | 15.0 | 12.0 |
| do. | 20.0 | 5.6 |
| do. | 30.0 | 0 |
| Tetrathionate Inactivated Bromelain | 10 | 3.3 |
| 2-Hydroxyethyl disulfide Inactivated Bromelain | 10 | 2.0 |
| Oxidized Thioglycerol Inactivated Bromelain | 10 | 1.8 |
| Bromelain inactivated with para-aminophenyl disulfide | 6.7 | 40.3 |
| Bromelain inactivated with 4,4' - Dithiodipyridine | 6.7 | 39.8 |
| Bromelain inactivated with Ellman's Reagent | 6.7 | 40.5 |
| Bromelain inactivated with NaOH + aging | 6.7 | 50.6 |
| Bromelain inactivated with Iodoacetate | — | 62.2 |

This example shows the effective reactivation, and therefore tenderization, of enzymes reversibly inactivated by treatment with disulfide reagents of the present invention. Conversely, the above data illustrates the treatment of enzymes with other disulfide reagents results in a final product that has not been adequately tenderized, presumably because the enzyme was not sufficiently reactivated in situ.

EXAMPLE IX

A. Short Term Stability of Bromelain

To determine the maximum amount of activity that can be derived from a given sample of crude enzyme powder, 20 grams of crude bromelain was mixed with 20 grams glycerine in a 250 ml beaker. At time zero, 175 ml of cold distilled water, or 175 ml of distilled water containing NaOH, or 175 ml of distilled water containing NaOH+EDTA+tetrathionate was added, giving 200 ml of a 10% solution. For fifteen seconds the sample was stirred with a stirring rod, and the sample was then put in an ice bath and the stirring continued with a magnetic stirrer. After 3 minutes, RMCU and NRMCU determinations were made. The 3 minute values with water are considered to be 100%. The results are included in the following table:

| Treatment | pH | % RMCU | NRMCU |
|---|---|---|---|
| Water only | 4.6 | 100 | 100 |
| 5N NaOH | 5.4 | 100 | 94 |
| do. | 6.2 | 98 | 89 |
| do. | 7.0 | 93 | 79 |
| do. | 8.0 | 86 | 76 |
| do. | 9.4 | 83 | 66 |
| NaOH & EDTA & Tetrathionate | 9.0 | 100 | 1 |

The RMCU data show that alkali causes an immediate loss of activity, but that tetrathionate protects against the loss. The NRMCU data show that the bromelain was inactivated in 3 minutes by tetrathionate.

B. Long Term Stability

In addition to short term loss, bromelain solutions are relatively unstable, even at cooler temperature. This is particularly true at pH's of 6–7. To demonstrate this point, 10% bromelain solutions were prepared as outlined in Section A using pH 7 and 9 with and without tetrathionate (all in presence of 5% EDTA). The solutions were stored at 5°C. and analyzed at 0, 1, 4, 7, 14 and 28 days with the following results.

| | RMCU | | | | | |
|---|---|---|---|---|---|---|
| | Days Storage at 5°C. | | | | | |
| | 0 | 1 | 4 | 7 | 14 | 28 |
| pH 7 | 207 | 172 | 133 | 122 | 109 | 104 |
| pH 7 + Tetrathionate | 222 | 214 | 207 | 208 | 214 | 220 |
| pH 9 | 206 | 196 | 176 | 169 | 161 | 161 |
| pH 9 + Tetrathionate | 207 | 207 | 207 | 200 | 198 | 200 |

The data show that at pH 7 bromelain is least stable, and although it is more stable at pH 9, there is a 30% loss in 280 days. However, tetrathionate-treated solutions retain as much as 97% of their activity during this same period.

Another similar test was conducted over a period of 15 days to demonstrate the stability of bromelain inactivated by tetrathionate, 2-hydroxyethyl disulfide, and tetramethylthiuram disulfide. The results are as follows:

| Bromelain Inactivator | RMCU values Days | | | | |
|---|---|---|---|---|---|
| | 0 | 1 | 4 | 7 | 15 |
| Control | 208 | 189 | 172 | 165 | 147 |
| 2-Hydroxyethyl disulfide | 206 | 204 | 200 | 206 | 198 |
| Tetrathionate | 206 | 204 | 204 | 203 | 197 |
| Tetramethylthiuram disulfide | 207 | 200 | 202 | 207 | 197 |

The data show that the three disulfide inactivators stabilized the bromelain during extended storage.

C. Stability Against Peroxide Oxidation

Another way to demonstrate protection against oxidation is to add varying amounts of hydrogen peroxide to enzyme solutions that have had various inactivating treatments. Fresh bromelain samples were prepared as in Section A, and mixed for ten minutes before adding peroxide. The peroxide treated samples were stored for one hour at refrigerator temperatures, then analyzed. The results are as follows:

| Amount Peroxide | | RMCU VALUES | |
|---|---|---|---|
| | | Fresh | Tetrathionate Treated |
| 0 | | 81.5 | 81.7 |
| 0.55 | $\times 10^{-4}$ M | 75.0 | 81.7 |
| 1.1 | $\times 10^{-4}$ | 75.0 | 80.8 |
| 2.2 | $\times 10^{-4}$ | 67.0 | 76.4 |
| 4.4 | $\times 10^{-4}$ | 60.0 | 78.2 |
| 8.8 | $\times 10^{-4}$ | 40.0 | 77.0 |
| 35.2 | $\times 10^{-4}$ | 12.0 | 76.4 |

The results show that fresh bromelain is almost totally destroyed by peroxide, whereas the tetrathionate inactivated sample is virtually unharmed.

EXAMPLE XI

A series of 4% crude ficin solution were prepared with 2% EDTA at pH 9.0. One portion was aged overnite in cooler and the other was inactivated with 10m of either sodium tetrathionate, 2-hydroxyethyl disulfide, or cystamine. The solutions were diluted to contain 40 RMCU/ml, and injected at dosage of 1ml/lb. (5 chickens/group) with the following results:

| Inactivator | Average Survival Time (Min.) |
|---|---|
| Aged (natural inactivation) | 13 |
| Sodium tetrathionate | 120 |
| 2-hydroxyethyl disulfide | 73 |
| Cystamine | 9 |

Both tetrathionate and 2-hydroxyethyl disulfide lowered the animal reaction of ficin, whereas cystamine did not.

EXAMPLE XII

A 1.25% crude papain solution was prepared and divided into portions, and inactivated with several disulfides. The results of injecting 1ml/lb. in live chickens appear as follows:

| Inactivator (10mM) | Survival Time (Min.) |
| --- | --- |
| None | 34 |
| Tetrathionate | 120* |
| 6,6-dithiodinicotinic acid | 120* |
| Thiamine disulfide | 77 |

*birds would probably survive indefinitely, but were routinely discarded after two hours.

The results show that all three disulfides lowered the animal reaction of crude papain.

EXAMPLE XIII

A bromelain solution was prepared by aging at pH 9.0 overnite in cooler and filtered. The solution was then diluted to contain 33 RMCU/ml, and was injected at the rate of 1ml/lb. into nine control chickens to establish the degree of reaction of this enzyme sample. Then two groups of four birds each were injected with 1ml per lb. of a 10mM solution of sodium tetrathionate and potassium iodate followed by 5 minutes later by enzyme. The survival time is measured from time of enzyme injection with the following results:

| | Avg. Survival Time (Min.) |
| --- | --- |
| Control (enzyme only) | 25.8 |
| Potassium Iodate & Enzyme | 57.0 |
| Tetrathionate & Enzyme | 40.8 |

In another experiment bromelain was inactivated by either 2mM or 100mM tetrathionate and injected into five chickens per group with following results:

| | Avg. Survival Time (Min.) |
| --- | --- |
| 2mM tetrathionate | 32 |
| 100mM tetrathionate | 73 |

These experiments indicate that by lowering the activating capacity of the blood by either using an excess of disulfide, or by prior injection of certain chemical oxidizing agents, the animal reaction may be substantially lowered.

EXAMPLE XIV

A 10% solution of crude papain was prepared at pH 7.5, divided into three portions and inactivated with 0, 10, or 20mM thiamine disulfide. NRMCU milk clot values were determined periodically (the solution held in cooler). Following gives rate of drop of NRMCU for the three solutions:

| Time (Min.) | Level of Thiamine Disulfide | | |
| --- | --- | --- | --- |
| | 0 | 10mM | 20mM |
| 0 | 36 | 32 | 22 |
| 15 | 33 | 11 | 10 |
| 30 | 32 | 5 | 6 |
| 45 | — | 2 | 3 |
| 60 | — | 1.5 | 2 |

While thiamine disulfide causes the inactivation of crude papain, the fact that the rate of inactivation isn't effected by doubling the level indicates that thiamine disulfide isn't directly inactivating the papain.

EXAMPLE XV

Prepared four 5% takamine ficin solutions at pH 7.5 containing 0, 2.5, 5.0 and 10.0% garlic juice. After two hours milk clot values were obtained as follows:

| % Garlic Juice | RMCU | NRMCU |
| --- | --- | --- |
| 0 | 126 | 65 |
| 2.5 | 139 | 7 |
| 5.0 | 136 | 1 |
| 10.0 | 139 | 0.4 |

The results indicate that the disulfide of garlic juice reversibly inactivates crude ficin while protecting the total activity.

Obviously, many modifications and variations of the invention as hereinbefore set forth may be made without departing from the spirit and scope thereof, and therefore only such limitations should be imposed as are indicated in the appended claims.

We claim:

1. A method to improve tenderness of meat through proteolytic action, the steps comprising: forming an aqueous solution of a sulfhydryl protease said solution containing from about 0.25 to 25% sulfhydryl protease by weight of the solution; reversibly inactivating the protease by reacting same in the aqueous medium at a pH of from about 6 to 12 and at a temperature of from about 0°C. to 25°C. with from about 1 to 100 moles of inactivator per mole of sulfhydryl protease, said inactivator selected from the group consisting of 2-hydroxyethyl disulfide, cystine, oxidized glutathione, bis ($\beta,\gamma$ dihydroxy propyl) disulfide, garlic juice disulfides, dithiodipropanol, 6,6-dithiodinicotinic acid, thiamin disulfide, tetramethyl thiuram disulfide, and mixtures thereof; introducing the protease solution into the vascular system of a living animal at a dosage of from about 0.1 to 150 mg. of enzyme per pound of live weight of the animal whereby said protease is slowly reactivated; and thereafter slaughtering said animal.

2. The method of claim 1 wherein the sulfhydryl protease is selected from the group consisting of plant sulfhydryl proteases, animal sulfhydryl proteases, and microbial sulfhydryl proteases.

3. The method of claim 1 wherein an oxidizing reagent or disulfide reagent is injected into the animal's blood stream prior to injection of the sulfhydryl protease solution.

4. The method of claim 1 wherein the sulfhydryl protease is selected from the group of enzymes consisting of papain, bromelain, ficin and mixtures thereof.

5. The method of claim 4 wherein a chelating agent is added to the reaction medium to tie up heavy metal ions.

6. The method of claim 5 wherein the pH of the enzyme solution has been adjusted to from about 7 to 9 prior to inactivation.

7. The method of claim 6 wherein the disulfide inactivator is thiamin disulfide.

8. The method of claim 6 wherein the animal is subsequently slaughtered within about 1 hour.

9. The method of claim 8 wherein the enzyme solution contains from about 2–10% enzyme by weight of the solution.

10. The method of claim 9 wherein the reaction is carried out at a temperature of from about 0°C. to 5°C., and wherein from about 1 to 10 moles of inactivator are used for every mole of enzyme.

11. The method of claim 10 wherein the enzyme is injected into the live animal at a dosage of from about 0.5 to 60 mg. of enzyme per lb. of live weight of the animal, and wherein the animal is slaughtered within from about 10 to 30 minutes.

12. A method to improve tenderness of meat through proteolytic action, the steps comprising: forming an aqueous solution of a sulfhydryl protease said solution containing from about 0.25–25% sulfhydryl protease by weight of the solution; reversibly inactivating the protease by reacting same in the aqueous medium at a pH of from about 6 to 12 and at a temperature of from about 0°C. to 25°C. with from about 1 to 100 moles of a mixed disulfide inactivator prepared by reacting a thiol compound with a symmetrical disulfide selected from the group consisting of 2-hydroxyethyl disulfide, cystine, oxidized glutathione, bis ($\beta,\gamma$ dihydroxy propyl) disulfide, garlic juice disulfides, dithiodipropanol, 6,6-dithiodinicotinic acid, thiamin disulfide, tetramethyl thiuram disulfide, and mixtures thereof; introducing the inactivated protease solution into the vascular system of a living animal at a dosage of from about 0.1 to 150 mg. of enzyme per pound of live weight of the animal whereby said protease is slowly reactivated; and thereafter slaughtering said animal.

13. The method of claim 12 wherein the sulfhydryl protease is selected from the group of enzymes consisting of papain, bromelain, ficin and mixtures thereof.

14. The method of claim 13 wherein a chelating agent is added to the protease solution prior to reaction, and wherein the reaction between the protease and mixed disulfide is carried out at a pH of from about 7 to 9.

15. The method of claim 14 wherein the enzyme solution is injected into the live animal at a dosage of from about 0.5 to 60 mg. of enzyme per pound of live weight of the animal, and wherein the animal is slaughtered within from about 10 to 30 minutes thereafter.

16. A method to improve tenderness of meat through proteolytic action, the steps comprising: preparing an aqueous sulfhydryl protease solution at a pH of from about 6 to 12 and at a temperature of from about 0°C. to 25°C., said solution containing from about 0.25–25% protease by weight of the solution; adding thereto from about 1 to 100 moles per mole of protease of a sulfhydryl compound selected from the group consisting of cysteine, mercaptoethanol, thioglycerol, mercaptopropanol, thionicotinic acid, reduced glutathione, dimethyl dithiocarbamic acid, and mixtures thereof; holding the protease solution in the presence of air to allow oxidation of the sulfhydryl compound to its disulfide dimer, which in turn reversibly inactivates the sulfhydryl protease; introducing the protease solution into the vascular system of a living animal at a dosage of from about 0.1 to 150 mg. of enzyme per pound of live weight of the animal whereby said protease is slowly reactivated; and thereafter slaughtering said animal.

17. The method of claim 16 wherein the sulfhydryl protease is selected from the group of enzymes consisting of papain, bromelain, ficin and mixtures thereof.

18. The method of claim 17 wherein a chelating agent is added to the protease solution prior to reaction, and wherein the pH of the protease solution is adjusted to from about 7 to 9 prior to addition of the sulfhydryl compounds.

19. The method of claim 18 wherein the protease solution contains from about 2–10% enzyme by weight of the solution.

20. The method of claim 19 wherein the enzyme is injected into the live animal at a dosage of from about 0.5 to 60 mg. of enzyme per pound of live weight of animal, and wherein the animal is slaughtered within from about 10 to 30 minutes thereafter.

* * * * *